United States Patent
Starovoitov et al.

(10) Patent No.: US 8,516,456 B1
(45) Date of Patent: Aug. 20, 2013

(54) COMPACT INSTRUCTION FORMAT FOR CONTENT SEARCH SYSTEMS

(75) Inventors: Alexei Starovoitov, Los Gatos, CA (US); Greg Watson, Palo Alto, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 433 days.

(21) Appl. No.: 12/944,442

(22) Filed: Nov. 11, 2010

(51) Int. Cl.
    *G06F 9/45* (2006.01)

(52) U.S. Cl.
    USPC .......................................................... 717/141

(58) Field of Classification Search
    USPC .......................................................... 717/141
    See application file for complete search history.

(56) References Cited

U.S. PATENT DOCUMENTS

| | | | | |
|---|---|---|---|---|
| 5,699,507 A * | 12/1997 | Goodnow et al. | ............. | 714/38.1 |
| 7,529,746 B2 | 5/2009 | Ichiriu et al. | ..................... | 707/5 |
| 7,539,031 B2 | 5/2009 | Ninan et al. | .................. | 365/49.1 |
| 7,539,032 B2 | 5/2009 | Ichiriu et al. | ................. | 365/49.1 |
| 7,624,105 B2 | 11/2009 | Ichiriu et al. | ..................... | 707/4 |
| 7,643,353 B1 | 1/2010 | Srinivasan et al. | ......... | 365/49.17 |
| 7,644,080 B2 | 1/2010 | Mammen et al. | .................. | 707/6 |
| 7,656,716 B1 | 2/2010 | Srinivasan et al. | ......... | 365/49.17 |
| 7,660,140 B1 | 2/2010 | Joshi et al. | ................ | 365/49.17 |
| 7,694,068 B1 | 4/2010 | Rosman | | |
| 7,787,275 B1 | 8/2010 | Birman et al. | ............... | 365/49.1 |
| 7,826,242 B2 | 11/2010 | Joshi et al. | ................. | 365/49.17 |
| 7,872,890 B1 | 1/2011 | Starovoytov | ............... | 365/49.17 |
| 7,876,590 B2 | 1/2011 | Joshi et al. | ................. | 365/49.17 |
| 7,916,510 B1 | 3/2011 | Starovoitov et al. | ......... | 365/49.1 |
| 8,051,085 B1 | 11/2011 | Srinivasan et al. | ............ | 707/737 |
| 2008/0212581 A1 | 9/2008 | Miller et al. | .................. | 370/389 |
| 2009/0228693 A1 * | 9/2009 | Koenck et al. | ................ | 712/248 |

* cited by examiner

*Primary Examiner* — John Chavis

(74) *Attorney, Agent, or Firm* — Sterne, Kessler, Goldstein & Fox PLLC

(57) ABSTRACT

A system and method are disclosed that compiles a sub-expression associated with an inexact pattern contained in a regular expression into a plurality of microprogram instructions that can be stored in contiguous locations of an instruction memory. At least one of the microprogram instructions includes a next instruction address and a fetch length value, where the next instruction address indicates the instruction memory address of the next instruction to be executed and the fetch length value indicates the number of sequentially-executed instructions that are to be fetched from contiguous locations of the instruction memory.

24 Claims, 12 Drawing Sheets

Microprogram Instructions 218 — 610

| Trigger Index | Location | OPCODE | MATCH ADDRESS | OFFSET | LEN |
|---|---|---|---|---|---|
| for "abcde" | N+0 | Match? | 0006 | +1 | +4 |
| | N+1 | Match? | 0007 | | |
| | N+2 | Match? | 0008 | | |
| | N+3 | Match? | 0009 | | |
| | N+4 | Match? | 0006 | | |
| | N+5 | Match? | 0488 | | |
| | N+6 | Match? | 0489 | | |
| | N+7 | Result=T | | | |
| for "ade" | N+8 | Match? | 0006 | +1 | +2 |
| | N+9 | Match? | 0488 | | |
| | N+10 | Match? | 0489 | | |
| | N+11 | Result=T | | | |

620 → (for "abcde" row group)
630 → (for "ade" row group)

FIG. 6B

Regular Expression

R2 = rain-a(bc)?de

Exact Sub-Expressions

T1 = rain-
T3 = de

Inexact Sub-Expressions

T2$_0$ = a(bc)?

Inexact Sub-Expressions (Compiler Expansion)

T2$_1$ = abc
T2$_1$ = a

COMPACT INSTRUCTION FORMAT FOR CONTENT SEARCH SYSTEMS

TECHNICAL FIELD

The present disclosure relates generally to content search systems, and specifically relates to a content search system having a microprogram instruction format for representing search graphs.

BACKGROUND OF RELATED ART

Search operations involving regular expressions are employed in various applications including, for example, intrusion detection systems (IDS), virus detection, policy-based routing functions, internet and text search operations, document comparisons, and so on. A regular expression can simply be a word, a phrase, or a string of characters. For example, a regular expression including the string "gauss" would match data containing gauss, Gaussian, degauss, etc. More complex regular expressions include metacharacters that provide certain rules for performing the match. Some common metacharacters are the wildcard ".", the alternation symbol "|", and the character class symbol "[ ]." Regular expressions can also include quantifiers such as "*" to match 0 or more times, "+" to match 1 or more times, "?" to match 0 or 1 times, {n} to match exactly n times, {n,} to match at least n times, and {n,m} to match at least n times but no more than m times. For example, the regular expression "a.{2}b" will match any input string that includes the character "a" followed by exactly two instances of any character followed by the character "b" including, for example, the input strings "abbb," adgb," "a7yb," "aaab," and so on.

Traditionally, regular expression searches have been performed using software programs described by a sequence of instructions to be executed by one or more processors, for example, associated with a network search engine. For example, one conventional search technique that can be used to search an input string of characters for multiple patterns is the Aho-Corasick (AC) algorithm. The AC algorithm locates all occurrences of a number of patterns in the input string by constructing a finite state machine that embodies the patterns. More specifically, the AC algorithm constructs the finite state machine in three pre-processing stages commonly referred to as the goto stage, the failure stage, and the next stage. In the goto stage, a deterministic finite state automaton (DFA) or search tree is constructed for a given set of patterns. The DFA constructed in the goto stage includes various states for an input string, and transitions between the states based on characters of the input string. Each transition between states in the DFA is based on a single character of the input string. The failure and next stages add additional transitions between the states of the DFA to ensure that a string of length n can be searched in exactly n cycles. More specifically, the failure and next transitions allow the state machine to transition from one branch of the tree to another branch that is the next best (i.e. the longest) match in the DFA. Once the pre-processing stages have been performed, the DFA can then be used to search any input string for all of the deterministic patterns in the pattern set.

The foregoing describes search operations consistent with a DFA search tree implemented using a deterministic finite automaton state machine. Additionally, search operations using a series of instructions can also be similarly described. For example, each transition between states in the DFA can be represented as an instruction pertaining to a single character of the input string. Additional instructions describe the failure stage transitions and next stage transitions. More specifically, the instructions corresponding to the failure stage transitions and next stage transitions allow the execution of the series of instructions to transition from one instruction to another instruction that is the next best (i.e. the longest) match in the corresponding DFA.

One problem with prior string search engines using the AC algorithm is that that they are not well suited for performing wildcard or inexact pattern matching. As a result, some search engines complement the deterministic aspects of an AC search technique with a nondeterministic finite automaton (NFA) engine that is better suited to search input strings for inexact patterns, particularly those that include quantifiers such as "*" to match 0 or more times, "+" to match 1 or more times, "?" to match 0 or 1 times, {n} to match exactly n times, {n,} to match at least n times, and {n,m} to match at least n times but no more than m times.

For example, commonly-owned U.S. Pat. No. 7,539,032 discloses a content search system that implements search operations for regular expressions that specify one or more exact patterns and one or more inexact patterns by delegating exact pattern search operations to a DFA engine that is dedicated to perform exact pattern search operations and by delegating inexact pattern search operations to an NFA engine that is dedicated to perform inexact pattern search operations, where the match results of the exact pattern search operations and the match results of the inexact pattern search operations are combined to generate a result code that indicates whether an input string matches one or more regular expressions specifying the exact and inexact patterns.

FIG. 1A depicts a content search system 100 of the type disclosed in commonly-owned U.S. Pat. No. 7,539,032, which is incorporated by reference herein. More specifically, content search system 100 includes a system interface 110, a DFA engine 120, a data management unit 130, an NFA engine 140, and a result engine 150. The system interface 110 facilitates communication between search system 100 and an external network (e.g. the Internet), and is coupled to data management unit 130. More specifically, data management unit 130 receives input strings from the network via the system interface 110, selectively forwards portions of input strings to DFA engine 120 and/or NFA engine 140 for search operations, and coordinates communication between DFA engine 120, NFA engine 140, and result engine 150.

The data management unit 130 selectively forwards portions of input strings (e.g. regular expressions, or sub-expressions of regular expressions) to the DFA engine 120 or the NFA engine 140, depending in part on if the sub-expression 114 is an exact match sub-expression associated with an exact pattern (e.g. an exact sub-expression), or if the sub-expression is an inexact match sub-expression associated with an exact pattern (e.g. inexact sub-expression 116).

As disclosed in U.S. Pat. No. 7,539,032, the DFA engine 120 is configured to perform exact string match search operations to determine whether an input string contains exact patterns specified by one or more regular expressions, and the NFA engine 140 is configured to perform an inexact string match search operation to determine whether the input string contains one or more inexact patterns specified by one or more regular expressions. More specifically, the DFA engine 120 is implemented according to the AC algorithm, and the NFA engine 140 is implemented using various circuits (e.g. microprocessors, microcontrollers, programmable logic such as FPGAs and PLDs) that can execute microprograms that embody the inexact patterns to be searched for.

The result engine 150 includes a plurality of storage locations each for storing a result code that contains, for example, one or more match ID (MID) values, one or more trigger bits, and one or more microprogram indices. Each MID value identifies a corresponding exact pattern stored in the DFA engine that is matched by the input string, each trigger bit indicates whether the exact pattern identified by a corresponding MID value is part of a regular expression that requires inexact pattern search operations to be performed by the NFA engine, and each microprogram index can be used by the NFA engine to retrieve a microprogram that contains commands for implementing the inexact pattern search operation.

Referring to the microprogram that contains commands for implementing the inexact pattern search operation, such a microprogram can be implemented using conventional load/modify/store operations (e.g. using hardware register resources addressable by a microprogram instruction), or such a microprogram can be implemented using specialized instructions that are executed using NFA-related hardware resources addressable by a microprogram instruction. In either case, a system for inexact pattern searches involving a microprogram may include an instruction cache and an engine for managing such an instruction cache.

A significant limitation of search engines that use an instruction cache in combination with a microcontroller (i.e. a microprogram execution unit) to execute instructions of a microprogram that embodies an NFA sub-expression is that the instructions are typically stored in a random manner in memory, without regard to the sequence of state transitions of the underlying NFA search tree. As a result, sequentially executed instructions associated with implementing an NFA search operation may be distally located in the memory, thereby rendering instruction pre-fetching and caching relatively useless because of the large percentage of instruction cache misses during execution of the instructions.

For example, FIG. 1B depicts an NFA graph for a regular expression R1="a(bc)?de" and a conventional instruction set 150 that can be executed by the NFA engine of FIG. 1A to implement search operations for R1. For an input string to match the regular expression R1, the input string must include the character "a" followed by zero or more instances of either the characters "b" or "c" followed by the characters "d" and "e". To implement the search operation, the NFA engine 140 first fetches the instruction corresponding to the root node S0. As indicated in instruction set 150 of FIG. 1B, the first instruction 151(0) is located in an associated instruction memory (not shown for simplicity) at address N and includes the op-code "a" and next instruction addresses N+1 and N+3. Thus, if the NFA engine 140 determines a match between the first input character and the op-code "a" at S0, the NFA engine 140 fetches the two instructions 151(1) and 151(3) located at addresses N+1 and N+3 because a match on "a" at state S0 results in the simultaneous activation of states S1 and S3 to look for the characters "b" and "d", respectively, in the next search cycle. Then, the NFA engine 140 sequentially executes the instructions located at addresses N+1 and N+3. If there is a match with character "b" at state S1, then the NFA engine 140 fetches the instruction 151(2) located at address N+2 to transition the state machine to state S2, and if there is a match with character "d" at state S3, then the NFA engine fetches the instruction 151(4) located at address N+4 to transition the state machine to state S4.

When the NFA engine 140 fetches the instructions 151(1) and 151(3) in response to a character match at state S0, two separate read operations to the instruction memory are typically used because the instructions are not stored in successive locations in the instruction memory. More specifically, because the two instructions 151(1) and 151(3) are sequentially executed but not stored in sequential locations in the instruction memory, instruction pre-fetching operations are typically ineffective because a number of other instructions would be fetched but not executed in the next search operation. This problem is exacerbated for more complex regular expressions that include hundreds of instructions that are not stored in the instruction memory according to their order of execution.

Further, in a system for inexact pattern searches involving a microprogram that contains commands for implementing the inexact pattern search operation, a microprogram based on conventional load/modify/store operations may be long and/or large (i.e. contain a large number or instructions), and/or may contain many conditional branches. These two characteristics hinder high-performance instruction caching. For example, if a microprogram based on conventional load/modify/store operations is large, then the instruction cache may have to be as equally as long and/or large to contain the entire microprogram. Alternatively, even if the engine for managing the instruction cache is capable of performing speculation, for example speculation that a particular branch will be taken (or not taken), the likelihood of such speculation being correct for each branch prediction varies inversely with the length of the microprogram. Moreover, the complexity of an engine for managing the instruction cache increases as the complexity of the inexact pattern search increases.

Thus, there is a need for a content search system that can capitalize on microprogram-based NFA search techniques with compact representation and high-performance use of instruction cache resources.

BRIEF DESCRIPTION OF THE DRAWINGS

The present embodiments are illustrated by way of example and are not intended to be limited by the figures of the accompanying drawings, where:

FIG. 6B depicts a regular expression and an abstraction of a microprogram with entry points corresponding to the expansions of the inexact sub-expression "a(bc)?de", according to some embodiments;

Like reference numerals refer to corresponding parts throughout the drawing figures.

DETAILED DESCRIPTION

In the following description, numerous specific details are set forth such as examples of specific components, circuits, software and processes to provide a thorough understanding of the present disclosure. Also in the following description and for purposes of explanation, specific nomenclature is set forth to provide a thorough understanding of the present embodiments. However, it will be apparent to one skilled in the art that these specific details may not be required to practice the present embodiments. In other instances, well-known compiler processes and well-known circuits and devices are shown in block diagram form to avoid obscuring the present disclosure. It should be noted that the steps and operations (whether hardware-oriented operations or software-oriented operations) discussed herein (e.g. the loading of registers) can be performed either synchronously or asynchronously. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of myriad physical or logical mechanisms for communication between components. Additionally, the prefix symbol "/" or the suffix "B" attached to signal names indicates that the signal is an active low signal, respectively. Each of the active low signals may be changed to active high signals as generally known in the art.

Figure 2:
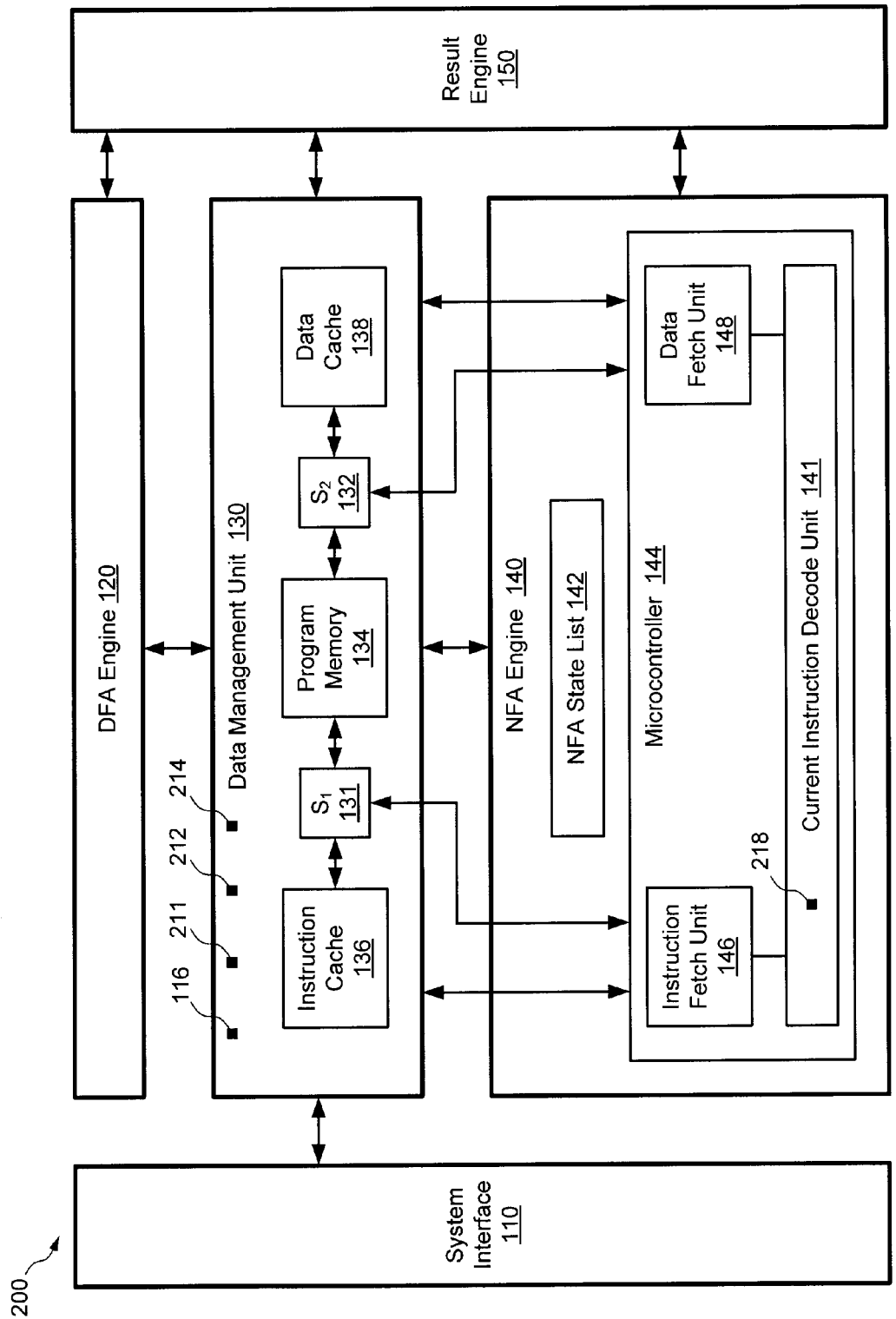
FIG. 2 is a block diagram of a content search system within which the present embodiments may be implemented.

FIG. 2 depicts a content search system 200 that includes a data management unit 130, a DFA engine 120, an NFA engine 140, and a result engine 150 that may be configured in accordance with present embodiments. As shown in FIG. 2, the data management unit 130 includes a program memory 134, an instruction cache 136, and a data cache 138, as well as an instruction speculator ($S_1$) 131 and a data speculator ($S_2$) 132. In typical embodiments, the program memory 134 is many times larger than the instruction cache 136. The NFA engine 140 includes an NFA state list 142 and a microcontroller 144.

The microcontroller 144 includes an instruction fetch unit 146 and a data fetch unit 148, as well as a current instruction decode unit 141.

As mentioned above, a content search system can implement regular expression search operations by delegating exact pattern matching functions to DFA engine 120, and delegating inexact pattern matching functions to NFA engine 140. For example, to determine whether an input string matches the regular expression R2="acid[a-n]{10,20}rain" using the search system shown in FIG. 2, the exact patterns 211 "acid" and "rain" are loaded into DFA engine 120, and a microprogram embodying instructions for matching the inexact pattern 212 (e.g. "[a-n]{10,20}") is loaded into the NFA engine 140. Further, the result engine 150 is loaded with MID values for "acid" and "rain" and with a microprogram index identifying the microprogram that embodies the inexact pattern 212 "[a-n]{10,20}." Then, during search operations, data management unit 130 forwards the input string to DFA engine 120, which in turn compares the input string to the prefix and suffix patterns "acid" and "rain." If a portion of the input string matches the prefix pattern "acid," the DFA engine 120 generates a first match index corresponding to the prefix pattern "acid," and in response thereto, the result engine 150 generates a result code that activates the NFA engine 140 and tells the NFA engine 140 the location of the microprogram instructions 218 for matching the inexact pattern "[a-n]{10, 20}." Once activated, the NFA engine 140, using the microprogram containing instructions for matching the inexact pattern, begins searching the input string for the inexact pattern "[a-n]{10,20}". In some embodiments, the NFA engine 140 can combine the exact match results from the DFA engine 120 for the suffix pattern "rain" to determine whether the input string contains a match corresponding to the regular expression R2="acid[a-n]{10,20}rain."

The delegation of different portions (e.g. sub-expressions) of a regular expression to DFA and NFA search engines improves performance over conventional single-engine approaches. Moreover, the performance of an NFA engine implemented using a microcontroller may be further improved by using a microprogram instruction cache. The presence of the microprogram instruction cache can improve NFA engine performance by providing rapid access (i.e., in case of a cache hit after a correct instruction pre-fetch operation) to the next microprogram instruction to be executed by the microcontroller. When the next microprogram instruction to be executed by the microcontroller is present in the microprogram instruction cache (i.e., a cache hit after a correct instruction pre-fetch operation), the next microprogram instruction can be rapidly accessed by the microcontroller (e.g., via the current instruction decode unit 141). However, when the next microprogram instruction to be executed by the microcontroller is not present in the microprogram instruction cache (i.e. a cache miss), retrieving the next microprogram instruction to be executed by the microcontroller may involve a second access to memory, specifically to program memory 134. During the time required for the second memory access (and possibly additional time to flush and replenish the instruction cache 136), the microprocessor may not have any microprogram instruction to execute, which in turn degraded performance.

Of course, there are many situations that can cause the next microprogram instruction to be executed to not be present in the microprogram instruction cache 136. For example, if the speculator $S_1$ 131 incorrectly predicted a branch, or if the current microprogram instruction is the last microprogram instruction in the microprogram instruction cache 136, meaning that the next microprogram instruction has not yet been loaded into the cache. Another situation that can cause the next microprogram instruction to be executed to not be present in the microprogram instruction cache 136 can arise when a branch (e.g. goto) is distally located in program memory (i.e. relative to the current instruction). This situation can often occur when searching for some types of regular expressions where the microprogram instructions 218 involved in determining an NFA match are distally located.

For example, to implement search operations for the regular expression R3="rain-a(bc)?de" in content search system 200, the prefix string "rain-" is delegated to DFA engine 120 and the inexact sub-expression "a(bc)?de" (which includes the conditional sub-expression "(bc)?") is delegated to the NFA engine 140. If the DFA engine 140 detects a match with "rain-", the NFA engine 140 is triggered, and the result engine 150 generates a result code that activates the NFA engine 140 and tells the microcontroller 144 the location of the microprogram embodying the inexact sub-expression "(bc)?", which then activates an NFA state that starts searching the input string for the sub-expression pattern "(bc)?". However, because the "(bc)?" can match against zero or one instances of "bc" in the input string, the corresponding microprogram includes instructions to be executed to match the substrings containing one occurrence of "bc" and also includes microprogram instructions to be executed to match the substrings containing zero occurrences of "bc".

Now, turning attention to the presence of the NFA state list 142 within the NFA engine 140, it can be recognized by those skilled in the art that certain search structures contain a plurality memory locations wherein any one or more of the locations can be configured to store or represent a given pre-defined character (e.g. predefined by a rule and/or a complier expression) for comparison with an input character. Further, such a rule or compiler assignment may assign one location to store "b" and assign another (distant) location to store "d". So, continuing the example, implementing a search operation for the regular expression R3="rain-a(bc)?de" may involve accessing the location for "b", the distal location for "d", and another distal location for "e". One approach for evaluating a regular expression such as R3="rain-a(bc)?de" is to translate (i.e. using a compiler) the symbolic representation of a character in the regular expression to the address of the corresponding NFA state list location. As earlier described, the regular expression such as R3="rain-a(bc)?de" can match the input string "rain-abcde" (where the string "bc" is present), or the regular expression can match the input string "rain-ade" (where the string "bc" is not present). Thus, absent embodiments of the techniques described herein, the microprogram instructions 218 for implementing an NFA graph for representing a regular expression may be distally located in memory, and thus may result in many cache misses when executing the microprogram.

Figure 3:
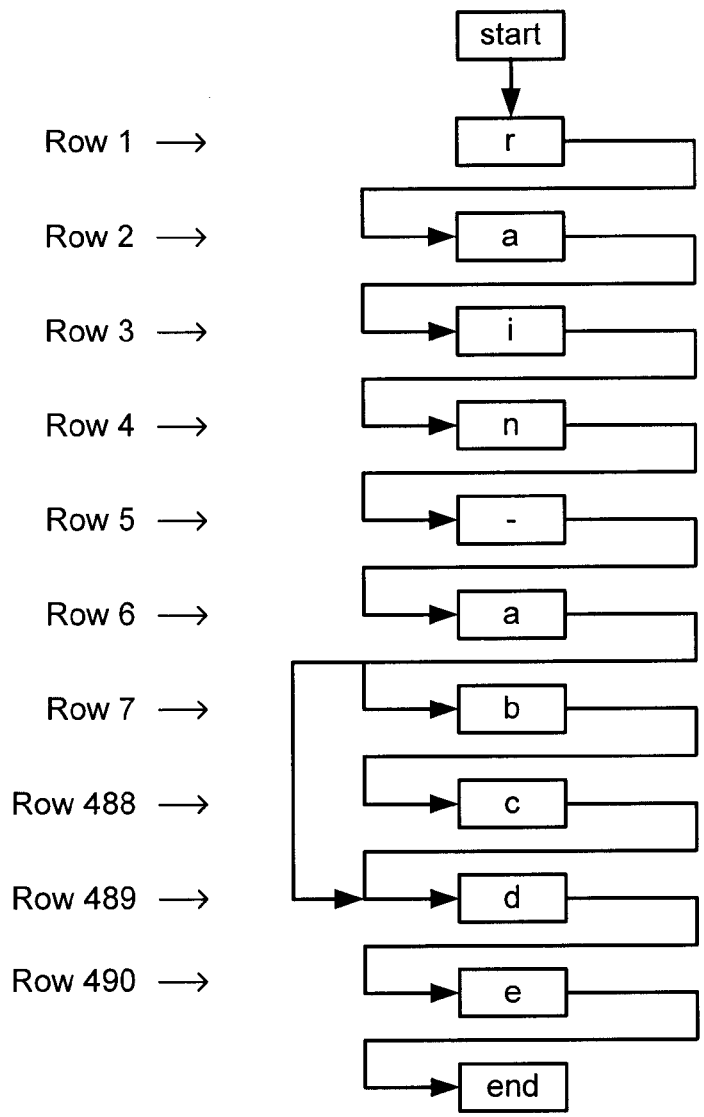
FIG. 3 shows an NFA graph embodying a regular expression R2="rain-a(bc)?de"

FIG. 3 depicts an NFA graph 300 of a regular expression R2="rain-a(bc)?de", which includes the conditional sub-expression SE2="(bc)?". The NFA graph of FIG. 3 includes exactly two possible paths from the position marked start to the position marked end, wherein the first the path is "rain-abcde" (where "bc" is present), and the second path is "rain-ade" (where "bc" is not present). For some embodiments, the rows indicated in the NFA graph 300 of FIG. 3 correspond to memory locations of the NFA state list 142 in the NFA engine 140 of FIG. 2.

Figure 4:
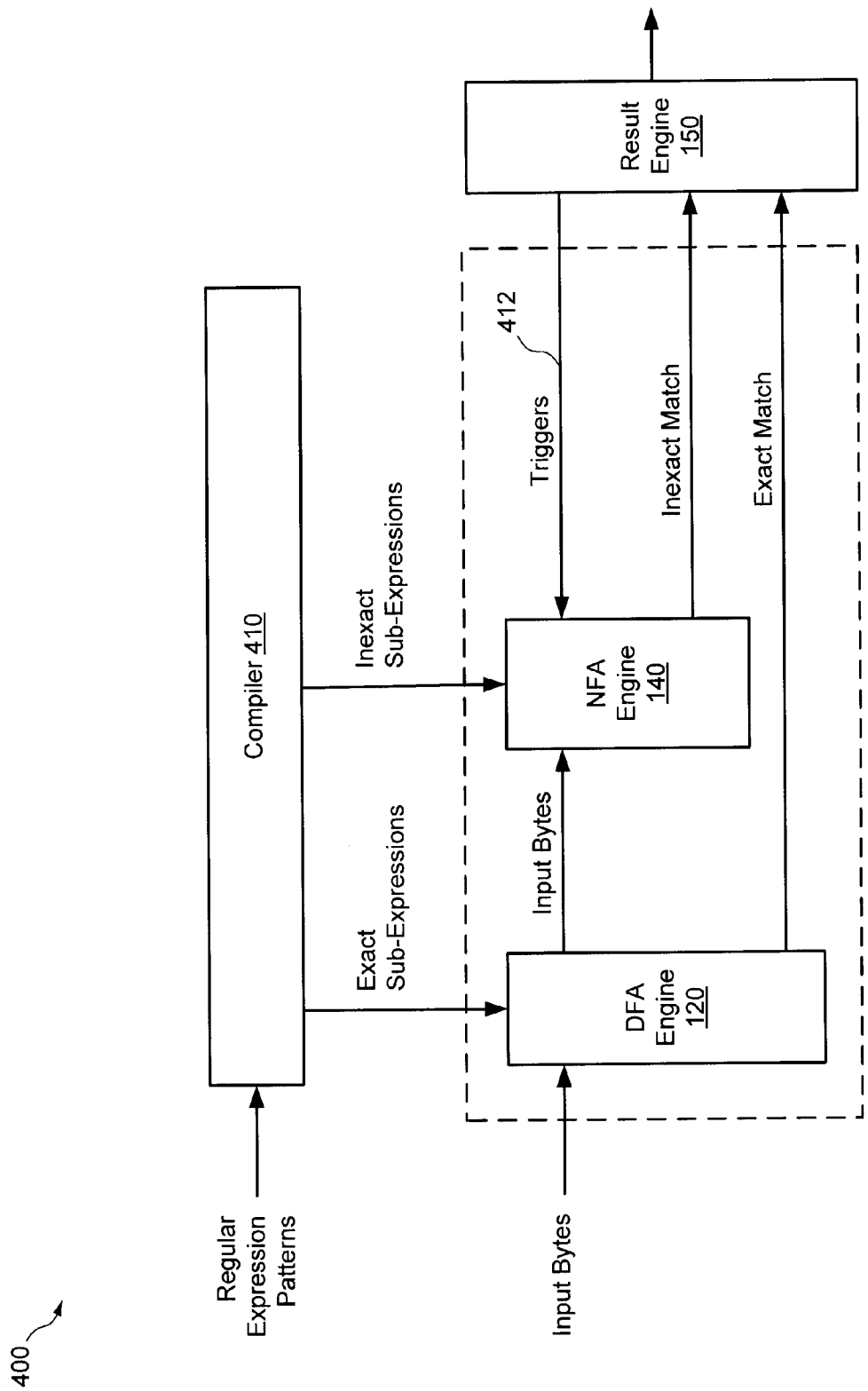
FIG. 4 is a block diagram of a content search system in accordance with some embodiments.

FIG. 4 depicts a content search system 400 including a compiler 410, DFA engine 120, and NFA engine 140 in accordance with other embodiments. As shown, the compiler 410 parses regular expressions, delegates some sub-expressions (e.g., exact expressions) to DFA engine 120, and delegates other sub-expressions (e.g., inexact expressions) to NFA engine 140. As mentioned above, the content search system implements regular expression search operations by delegating exact pattern matching functions to DFA engine 120 and delegating inexact pattern matching functions to NFA engine 140. Further, the DFA engine may identify an exact match of a string of input bytes (i.e. corresponding to an exact match sub-expression from a regular expression) and signal such as a match to the result engine 150, which in turn triggers the NFA engine 140 with a trigger signal 412 that includes or is associated with an index identifying the microprogram that embodies the corresponding inexact pattern. Once activated, the NFA engine 140 executes various instructions of the corresponding microprogram to search the input string for the inexact pattern. For the exemplary embodiment of FIG. 4, the NFA engine 140 signals the result engine 150 upon match of the inexact match results. The results generated by the DFA engine 120 and the NFA engine 140 are combined by the result engine 150 to determine whether the input string matches the regular expression.

Figure 5A:
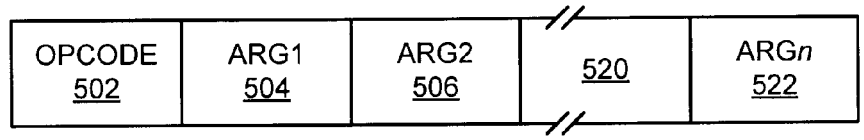
FIG. 5A depicts a variable argument microprogram instruction format, according to some embodiments.
Figure 5B:
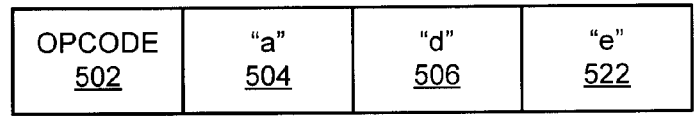
FIG. 5B depicts a variable argument microprogram instruction format representation of transitions in an NFA graph, according to some embodiments.

FIG. 5A depicts a variable argument microprogram instruction format. As shown, the microprogram instruction format comprises a bit field for an opcode 502, a bit field for a first argument 504, a bit field for a second argument 506, a bit field for a variable number of other arguments 520, and a bit field for an $n^{th}$ argument 522. Following this microprogram instruction format, an NFA graph can be represented in a series of arguments corresponding to the transitions of the NFA graph. For example, FIG. 5B shows a microprogram instruction format for string "ade", where the format includes an opcode 502, a first argument 504 representing "a", a second argument 506 representing "d", and a third argument 522 representing "e".

Figure 5C:
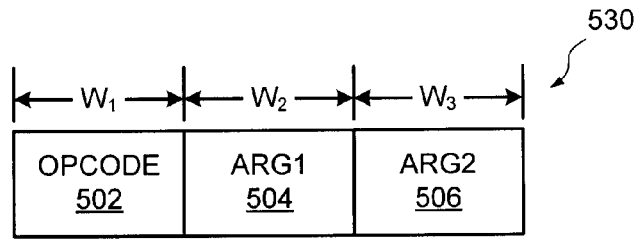
FIG. 5C depicts a two-argument microprogram instruction format representation of a transition in an NFA graph, according to some embodiments.

FIG. 5C depicts a two-argument microprogram instruction format 530 that can be used to represent a single transition in an NFA graph. Specifically, the argument microprogram instruction format includes an opcode 502, a first argument 504, and a second argument 506. A microprogram instruction of the form shown in FIG. 5C can represent a single transition in the NFA graph, for example a transition from "a" to "d", or from "d" to "e".

Figure 5D:
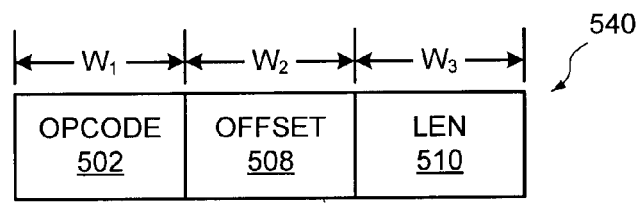
FIG. 5D depicts a possible microprogram instruction format implementing a compact microprogram instruction format for representing graph transitions in a content search system, according to some embodiments.

FIG. 5D depicts a possible microprogram instruction format representing graph transitions in a content search system. Specifically, the row-in-opcode instruction format 540 includes an opcode 502, an offset field 508 (OFFSET), and a length field 510 (LEN). While an instruction of the form as shown in FIG. 5D does not by itself represent a transition, an instruction of the form as shown in FIG. 5D, in combination with one or more additional instructions (e.g. also of the form as shown in FIG. 5D), can represent one or more transitions. For example, the OFFSET argument 508 can represent a distance offset (e.g. a number of sequential addresses forward or backward in memory, or a number of instructions forward or backward in memory). Also, the LEN argument 510 can represent a number of instructions to be included in a series of transitions.

Figure 5E:
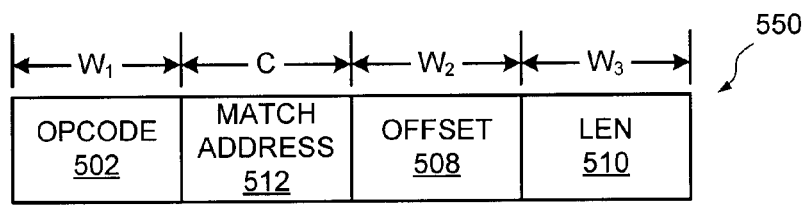
FIG. 5E depicts a possible microprogram instruction format implementing a compact microprogram instruction format for representing graph transitions in a content search system, according to some embodiments.

FIG. 5E depicts a possible microprogram instruction format implementing a compact microprogram instruction format for representing graph transitions in a content search system. Specifically, the row-after-opcode microprogram instruction format 550 comprises an opcode 502, a match address argument 512 (ROW ADDRESS), an offset argument 508 (OFFSET) and a length argument 510 (LEN). Comparing the row-in-opcode instruction format 540 to the row-after-opcode microprogram instruction format 550 offers the capability of storing more bits for representing the address of a row in the instruction memory. Although a microprogram instruction of the form as shown in FIG. 5E does not by itself represent a transition, a microprogram instruction of the form as shown in FIG. 5E in combination with one or more additional microprogram instructions (e.g. also of the form as shown in FIG. 5D or FIG. 5E) can represent one or more transitions. For example, the OFFSET argument can code a distance offset (e.g. a number of sequential addresses forward or backward in memory, or a number of microprogram instructions forward or backward in memory). Also, the LEN argument can code a number of microprogram instructions to be included in a series of transitions.

Figure 1A:
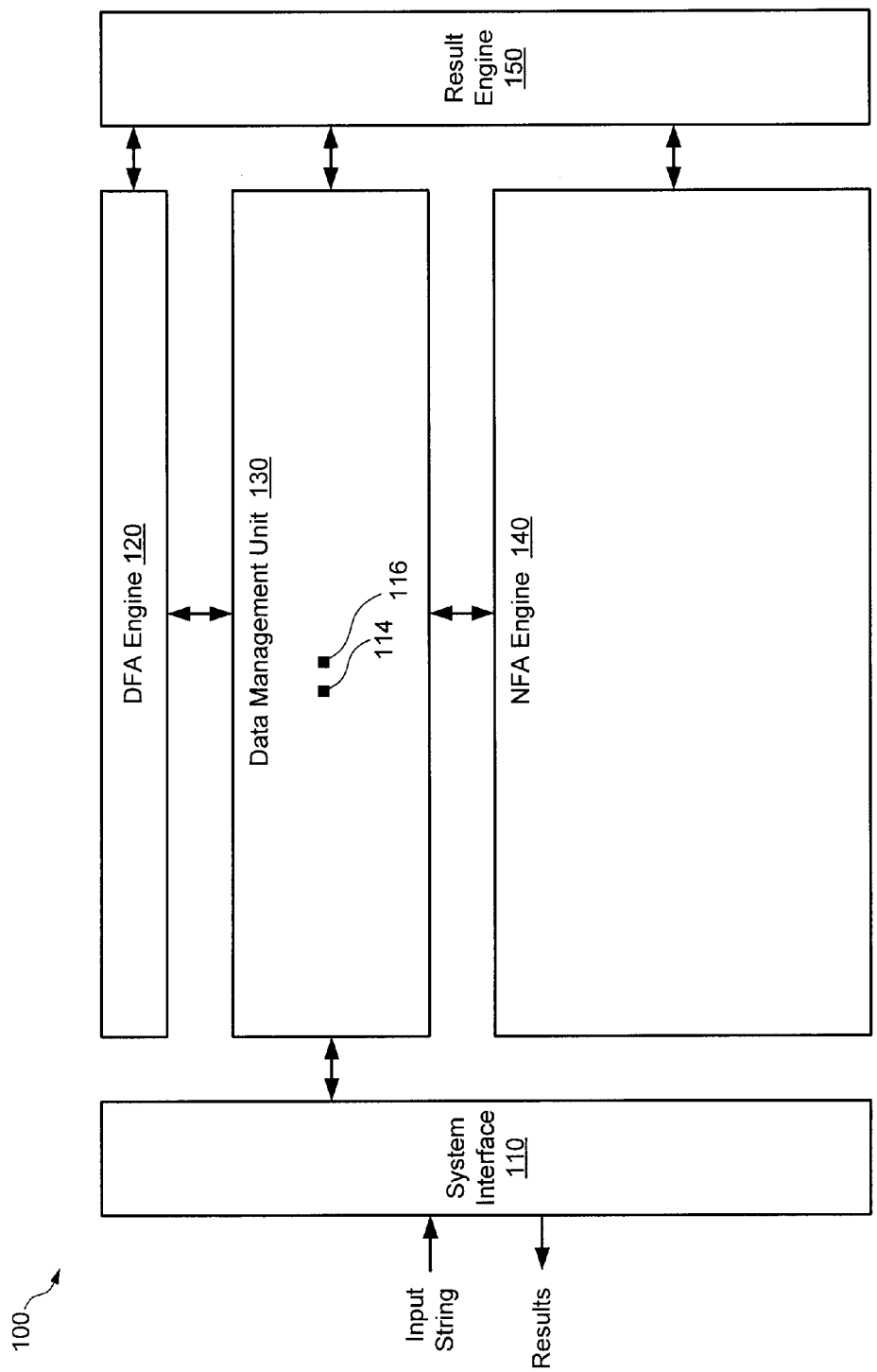
FIG. 1A is a block diagram of the general architecture a conventional content search system employing DFA and NFA engines.
Figure 1B:
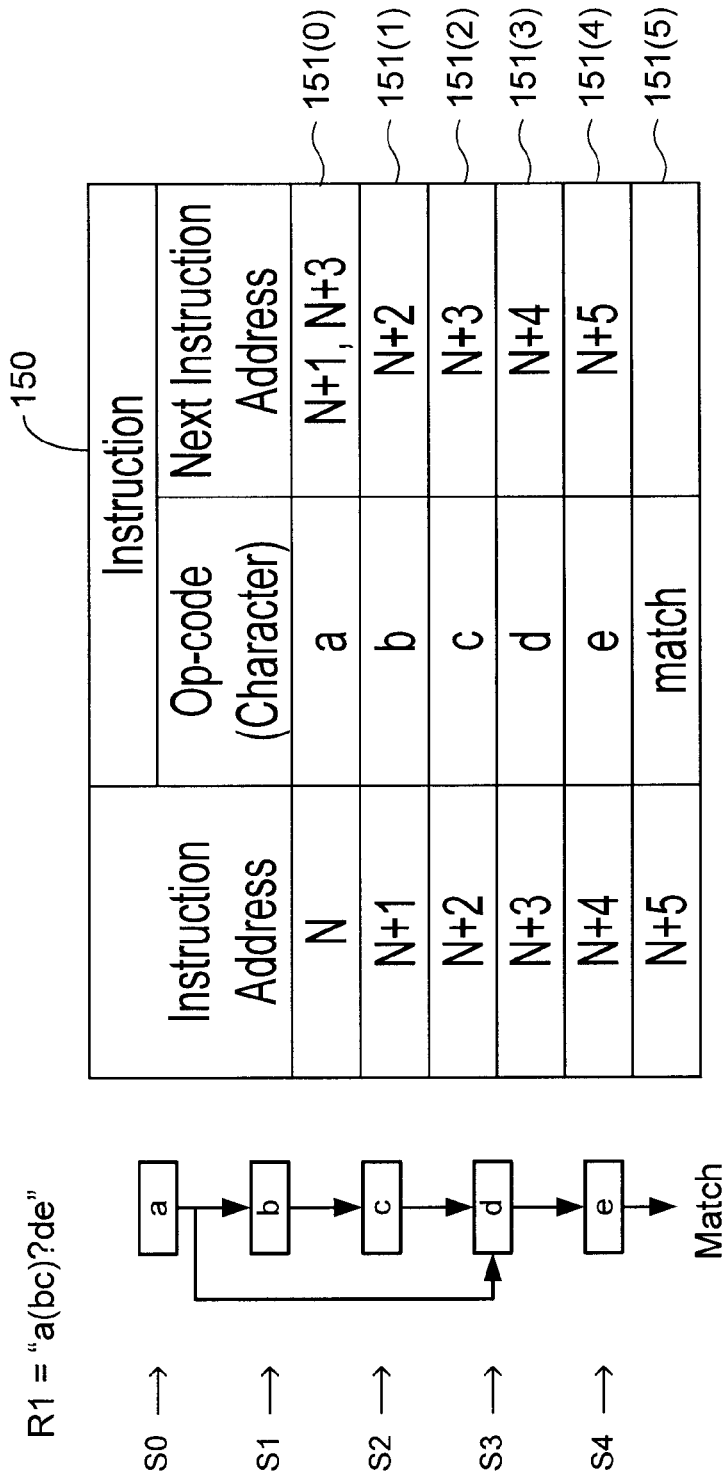
FIG. 1B depicts an NFA graph for a regular expression R1="a(bc)?de" and a conventional instruction set that can be executed by the NFA engine of FIG. 1A to implement search operations for R1.
Figure 6A:
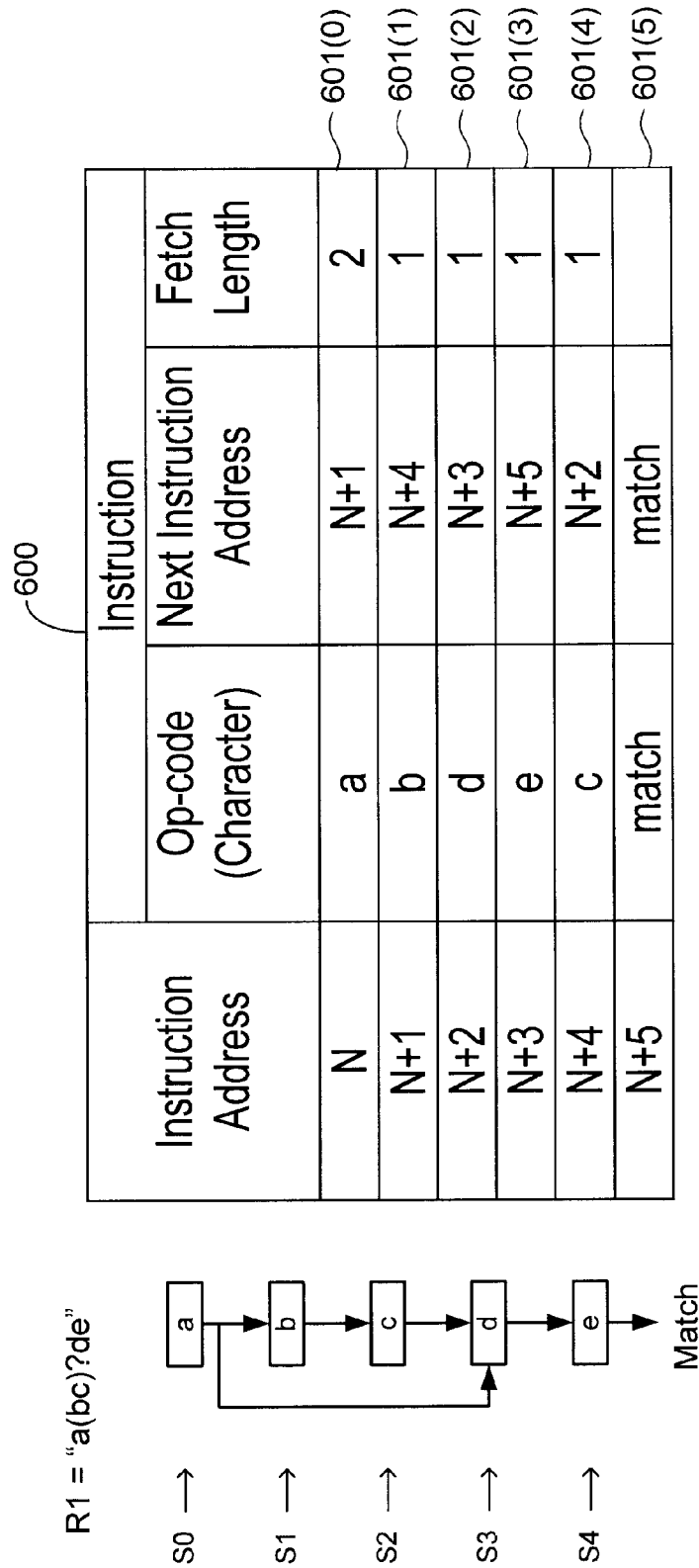
FIG. 6A depicts the NFA graph for the regular expression R1="a(bc)?de" and an instruction set modified in accordance with present embodiments that can be executed by the NFA engine of FIG. 1A to implement search operations for R1.

For example, FIG. 6A depicts the NFA graph for a regular expression R1="a(bc)?de" and an associated instruction set 600 modified in accordance with present embodiments. As described above with respect to FIG. 1B, for an input string to match the regular expression R1, the input string must include the character "a" followed by zero or more instances of either the characters "b" or "c" followed by the characters "d" and "e". In accordance with present embodiments, the instructions of instruction set 600 are stored in memory locations of the associated instruction memory (e.g., program memory 134 of FIG. 2) according their order of execution, rather than according to the order of states of the NFA graph. Further, in accordance with present embodiments, the instructions 601 in the instruction set 600 include a fetch length field to store a fetch length value that indicates how many subsequent sequentially-addresses instructions are to be fetched from the instruction memory and executed in association with processing the next character of the input string. In this manner, if execution of one instruction calls for the execution of multiple other instructions in the next search cycle, the multiple other instructions can be easily pre-fetched at the same time and stored in the instruction cache because they are stored at sequential locations in the instruction memory.

For example, to implement the search operation in accordance with present embodiments, the NFA engine 140 of content search system 200 of FIG. 2 first fetches the instruction corresponding to the root node S0. As indicated in instruction set 600 of FIG. 1B, the first instruction 601(0) is located in instruction memory 134 at address N, and includes the op-code "a," a next instruction address N+1, and a fetch length FL=2. Thus, if the NFA engine 140 determines a match between the first input character and the op-code "a" at S0, then the NFA engine 140 accesses memory at the location identified by the next instruction address field and fetches the next FL=2 sequentially stored instructions. For this example, the next instruction address field is N+1, and FL=2, so the NFA engine fetches the two instructions 601(1) and 601(2) located at addresses N+1 and N+2, respectively. The instructions 601(1) and 601(2) have respective op-codes of "a" and "d", which corresponds to the simultaneous activation of states S1 and S3 in the NFA graph in response to a match on "a" at state S0.

Then, the NFA engine 140 sequentially executes the instructions 601(1) and 601(2). If there is a match with character "b" at state S1, as determined by execution of instruction 601(1), then the NFA engine 140 fetches the instruction 601(4) located at address N+4 to transition the state machine to state S2, and if there is a match with character "d" at state S3, as determined by execution of instruction 601(2), then the NFA engine 140 fetches the instruction 601(3) located at address N+3 to transition the state machine to state S4.

Because the sequentially executed instructions 601(1) and 601(2) are stored at sequentially addressed locations in the instruction memory, the instructions can be pre-fetched from the instruction memory and stored in the instruction cache 136 for fast access by the NFA engine 140. In contrast, conventional NFA techniques may not store sequentially executed instructions in sequentially-addressed memory locations. For example, in contrast to the conventional instruction set 150 depicted in FIG. 1B, the instructions 601 of instruction set 600 of FIG. 6A are stored in order of execution rather than according to sequentially states of the NFA graph. More specifically, note that for the instruction set 600 of FIG. 6A, the instructions for the "b" and "d" states of the NFA graph are stored in sequential memory locations because a match on character "a" at state S0 simultaneously activates next states S1 and S3.

FIG. 6B depicts a regular expression and an abstraction of a microprogram 610 with entry points (e.g. a microprogram index) corresponding to the expansions of the inexact sub-expression "a(bc)?de". In particular, the microprogram 610 in memory contains entry points (as indicated by the column labeled "Trigger Index"). In such an embodiment, (e.g. as shown in FIG. 4), a result engine can trigger a microprogram to begin execution from a particular entry point (e.g. entry point for "abcde" 620, or entry point for "ade" 630.

It can be observed that given an entry point to the microprogram, a speculator (e.g. a speculator 131, a prefetch speculator, etc) can read the microprogram instruction contained at the entry point within a microprogram, and the speculator can prefetch microprogram instructions based on the offset and length of the microprogram instruction contained at the entry point within a microprogram. Moreover, in such a case, the speculator can prefetch the precise number of microprogram instructions required.

In another aspect of some embodiments, the microprogram instructions are compacted by virtue of re-use of sequences. That is, and as earlier indicated, a graph (or sub-graph) of an NFA graph (or sub-graph) can be represented by a microprogram instruction corresponding to a transition, followed by a microprogram instruction corresponding to the transition beginning the next longest match, and so on. An NFA graph having N transitions can be represented by a microprogram instruction to fire at the $0^{th}$ transition, followed by a microprogram instruction to fire at the $1^{st}$ transition, followed by a microprogram instruction to fire at the $2^{nd}$ transition, and so on through the Nth transition. This would result in a microprogram length on the order of N for a particular match path through the NFA graph; however, following a naïve approach to compiling a microprogram, there could be up to N separate microprograms, namely one microprogram beginning with a microprogram instruction to fire upon a match condition of the Mth transition (for each M≦N), and such a naïve approach may result in a microprogram instruction count of N**2 microprogram instructions. Pruning, by formulating microprograms to contain multiple entry points, can serve for reducing this number of microprogram instructions to only N! microprogram instructions. Yet, still more compaction is possible using the techniques disclosed herein.

Figure 7:
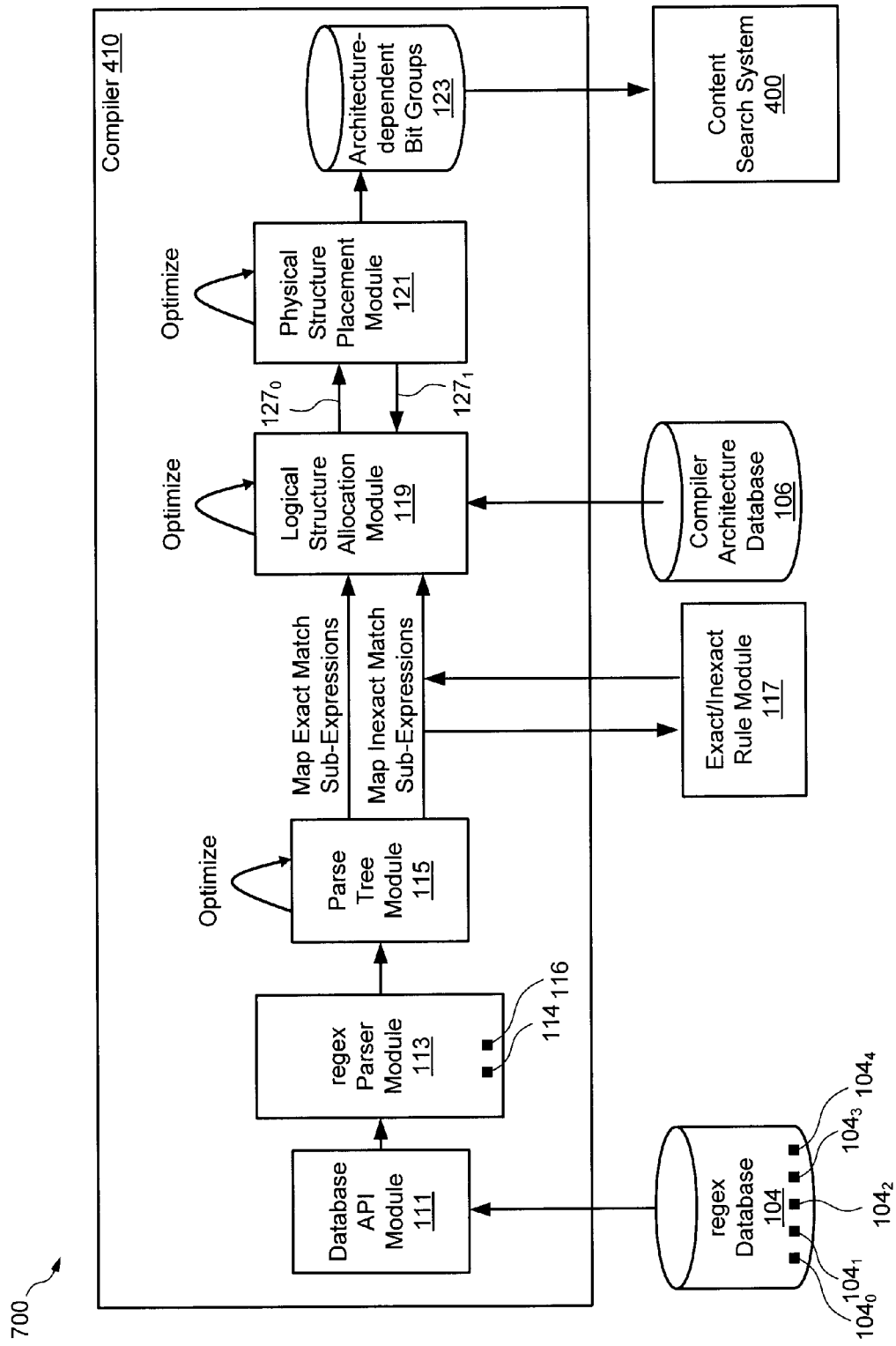
FIG. 7 depicts an environment for compiling a regular expression into bit groups for controlling programmable ternary content addressable memory structures, according to some embodiments.

FIG. 7 depicts an environment 700 for compiling a regular expression into bit groups (e.g. microprogram instructions) for controlling a content search system. In the environment shown, steps for programming ternary content addressable memory structures using a compiler 410 might commence as soon as there is at least one application requirement to be loaded into a regex database. Applications precipitating application requirements processing might include, for example, intrusion detection systems (IDS) and/or virus protection systems, and requirements might comprise specific policy-based routing functions, internet and text search operations, document comparisons, and so on. An application requirements process might be codified as human-readable descriptions such as "mark all messages containing the string "ci/-\lis" as spam", or "discard any network packets from IP address='127.192.148.XXX'". When application requirements are so sufficiently well identified that they can be codified into one or more regular expressions, a module to convert requirements into regular expressions might be employed for storing regular expressions into a regular expressions database (e.g. a database comprising source regular expressions 104). In some cases such a module to convert requirements into match expressions (e.g. regular expressions) can be computer-aided, relying in whole or in part on manual steps; or such a module to convert requirements into regular expressions might be fully automatic, converting application requirements into one or more representations (e.g. optimized regular expressions) suitable for storing regular expressions into a database including source regular expressions 104 for subsequent use.

A compiler 410 can be employed for compiling such representations into architecture-dependent bit groups for controlling content search systems, which bit groups might be passed to an image loader (not shown) for loading into the content search system. A compiler 410 might be embodied as a compiler, or might be embodied as a compiler-compiler. In either case, a compiler 410 might invoke various modules, including a module to convert a regular expression into a bit group, which bit group can include a microprogram of any length. Any constituent module of compiler 410, or any constituent module within the environment as shown, might access a compiler architecture database 106. Also, a well-known image loader (not shown for simplicity) might access a loader architecture database (not shown for simplicity). In some embodiments, the compiler architecture database 106 and the architecture database might represent the same architecture.

Continuing with the description of FIG. 7, an image loader might communicate with the content search system 400 over a link to load architecture-dependent bit groups into structures for storing microprogram instructions within the content search system 400. In some embodiments, the image loader might communicate with content search system 400 over a link capable of transmitting microprogram instructions in a file format. Envisioned file formats comprises formatting microprogram instructions into blocks that are described to include a record type, an initial load address (e.g. a target address for microprogram instructions and/or bit fields for operands or an array address, etc), a character string (e.g. a string of hex-formatted numbers, a string of octal-formatted numbers, a string of ones and zeroes, etc), and a checksum value. Other formats using ASCII characters, Unicode characters, and even binary representations are possible and envisioned.

As earlier mentioned, a compiler 410 might be embodied as a compiler, or might be embodied as a compiler-compiler, in which latter case a compiler 410 might include a parser or interpreter to generate compiler code (e.g. semantic action routines) from some form of formal description (e.g. a BNF description). Also, a compiler 410 might employ data structures used in the compiler arts, such as representing the compiler mapping problem as a multi-commodity network flow (MCNF) problem, or representing the compiler mapping problem in a control data flow graph (CDFG). Also, a compiler 410 might employ techniques for register allocation, techniques for managing asynchronous events, techniques for enumerating and evaluating feasible solutions, and techniques for optimizations, possibly including Lagrangian relaxation of constraints.

As shown, in FIG. 7, a database API module 111 reads from a database comprising source regular expressions 104 for passing formatted regular expressions to a regex parser module 113. The database comprising source regular expressions 104 may contain regular expressions of various types. There are many types and forms of regular expressions. For purposes of discussion herein, regular expressions are classified into four types or levels according to their complexity. Regular expressions that include only literal strings and logical operators, and that do not include any quantifiers, are classified as type-I or complexity level-I regular expressions. As described above, such literal strings can be assigned for processing to a DFA engine. More complex regular expressions, in particular those that contain specification of inexact matches are classified as type-II, type-III, or type-IV regular expressions as follows: Regular expressions that include logical operators for specifying inexact matches and use a greedy quantifier (e.g. "*", "+", or "?"), or a possessive quantifier expression (e.g. "*+", "++", "?+"), or a quantified number {m} of characters of a character class that does not overlap a preceding prefix string, are classified as type-II or complexity level-II regular expressions. Regular expressions that include logical operators for specifying inexact matches and use a quantified number {m} of characters of a character class that overlaps a preceding prefix string are classified as type-III or complexity level-III regular expressions. Regular expressions that include logical operators for specifying inexact matches and use a quantifier in the form of a quantified range {m,n} of characters of a character class that may overlap a preceding prefix string are classified as type-IV or complexity level-IV regular expressions.

The database comprising source regular expressions 104 may contain regular expressions of various types, for example, a type-I regular expression $104_1$, a type-II regular expression $104_2$, a type-III regular expression $104_3$, a type-IV regular expression $104_4$, or even a regular expression $104_0$ that has not been explicitly classified. A regex parser module 113 in turn may store and analyze a parse tree, possibly using a parse tree module 115. As is generally known in the art, such parsers serve to accept representations in a formally-defined syntax (e.g. in the formally-defined syntax of a regular expression) and produce representations that embody semantics. In the example as shown, the regex parser module 113, cooperatively with the parse tree module 115, maps (i.e. extracts semantics) a regular expression into, for example, exact match sub-expressions (e.g. exact sub-expression 114), which exact match sub-expressions are associated with an exact pattern, and/or inexact match sub-expressions (e.g. inexact sub-expression 116), which inexact match sub-expressions are associated with an inexact pattern. Regular expressions containing inexact sub-expressions can include "greedy quantifiers" expression constituents, "all-match" expression constituents, "non-greedy" expression constituents, and "min-match-len" expression constituents. In some such cases, a parse tree module 115 might map a regular expression (or exact match sub-expression of a regular expression) into a deterministic finite automaton state machine representation (e.g. for a DFA engine 120) using an exact/inexact rule module 117. In other cases, a parse tree module 115 might map a regular expression (or inexact match sub-expression of a regular expression) into an NFA engine 140.

Now, given the aforementioned parse tree, and the aforementioned constituent mappings to semantics, a further mapping to programmable structures (e.g. a program memory for containing a microprogram) can take place in a process such as is represented by the logical structure allocation module 119. Such a process maps the semantics of the regular expression into logical (programmable) structures available in content search system 400 as identified by the compiler architecture database 106. Of course in many cases, there may be multiple possible mappings, so a logical structure allocation module 119 may be configured to optimize, finding one or more optimal solutions from among the multiple possible mappings to logical structures, and using a cost function to evaluate the optimality of a given mapping.

Next, a selected (possibly optimal) allocation of logical structures might then be mapped to available physical structures. That is, even though a parse tree module 115 might map a regular expression (or sub-expression of a regular expression) into a programmable structure, it can remain to map remaining sub-expressions to any available physical structures (e.g. counters, sequencers, etc). The extent of available physical structures are managed by a physical structure placement module 121. Moreover, a physical structure placement module 121 may be configured to optimize, finding one or more feasible solutions from among the multiple possible mappings to physical structures, and using a cost function to evaluate the optimality of a given mapping. In some cases, logical structure allocation module 119 may be configured to optimize in cooperation with physical structure placement module 121, communicating over path $127_1$ (and/or path $127_0$), in order to optimize solutions under constraints of physically feasible solutions.

One or more (possibly optimal) mappings may be stored into a binary image of architecture-dependent bit groups 123, which bit groups may be loaded, possibly using an image loader, into one or more content search systems. The bit groups may contain various binary representations of values or symbols used for loading the values or symbols into any programmable structures.

Following the aforementioned flow, a method for compiling a source regular expression into a plurality of microprogram instructions for implementing regular expression search operations can be practiced. As shown and described, the components of environment 700 may be combined for parsing a source regular expression into one or more sub-expressions, for example, the one or more sub-expressions comprising at least one inexact sub-expression associated with an inexact pattern (e.g. using the regex parser module 113). Then, modules such as logical structure allocation module 119 and/or physical structure placement module 121 can be use for compiling the one or more inexact sub-expressions into the plurality of microprogram instructions such that the plurality of microprogram instructions form a contiguous group of microprogram instructions for loading into contiguous memory locations. The contiguous group of microprogram instructions can be loaded in the NFA engine from a binary image of architecture-dependent bit groups 123.

The parsing operations of the method can differentiate an exact sub-expression from an inexact sub-expression. In particular, some inexact sub-expressions can contain a "*" quantifier, a "?" quantifier, a "{n}" quantifier, a "{n,}" quantifier, and/or a "{n,m}" quantifier.

In some embodiments, the microprogram instructions are formatted as an opcode, an offset, and a length. In this manner, a speculator can correctly determine which, and how many, instructions should be prefetched from a program memory.

Figure 8:
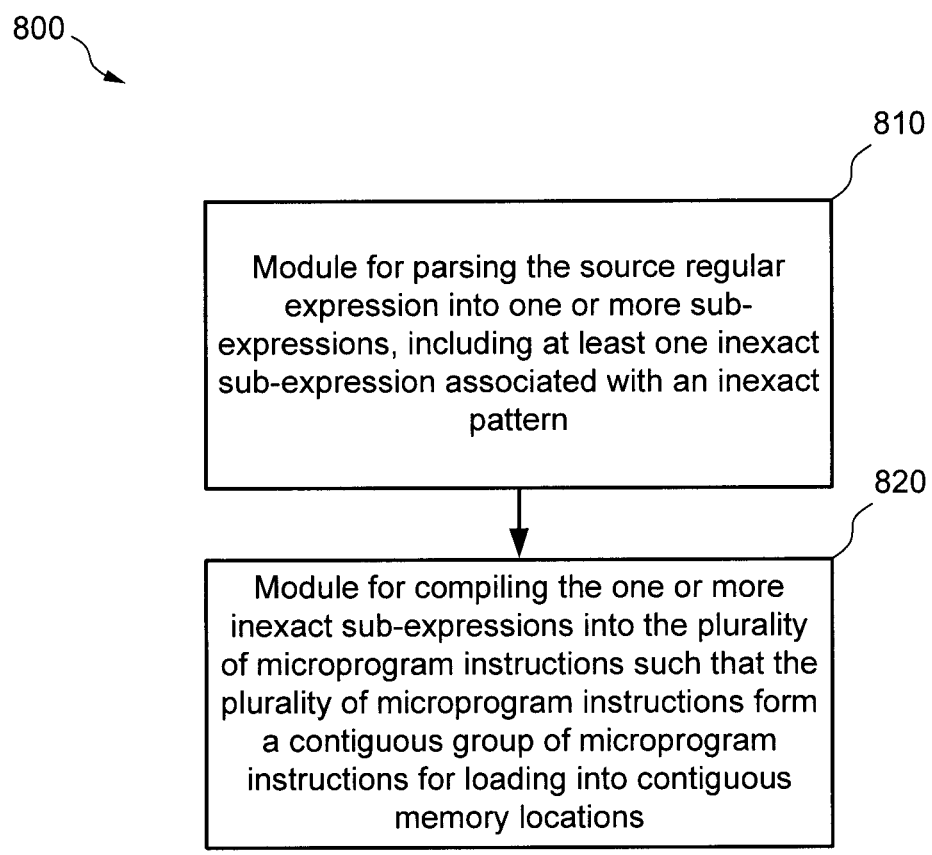
FIG. 8 is a block diagram of a system for controlling a content search system, according to some embodiments.

FIG. 8 depicts a block diagram of a system for compiling regular expressions for an NFA engine of an associated content search system. As an option, the present system 800 may be implemented in the context of the architecture and functionality of the embodiments described herein. Of course, however, the system 800 or any operation therein may be carried out in any desired environment. The modules of the system can, individually or in combination, perform method steps within system 800. Any method steps performed within system 800 may be performed in any order.

More specifically, system 800 includes a first module 810 for parsing the source regular expression into one or more sub-expressions, including at least one inexact sub-expression associated with an inexact pattern, and a second module 820 for compiling the one or more inexact sub-expressions into the plurality of microprogram instructions such that the plurality of microprogram instructions form a contiguous group of microprogram instructions for loading into contiguous memory locations.

Figure 9:
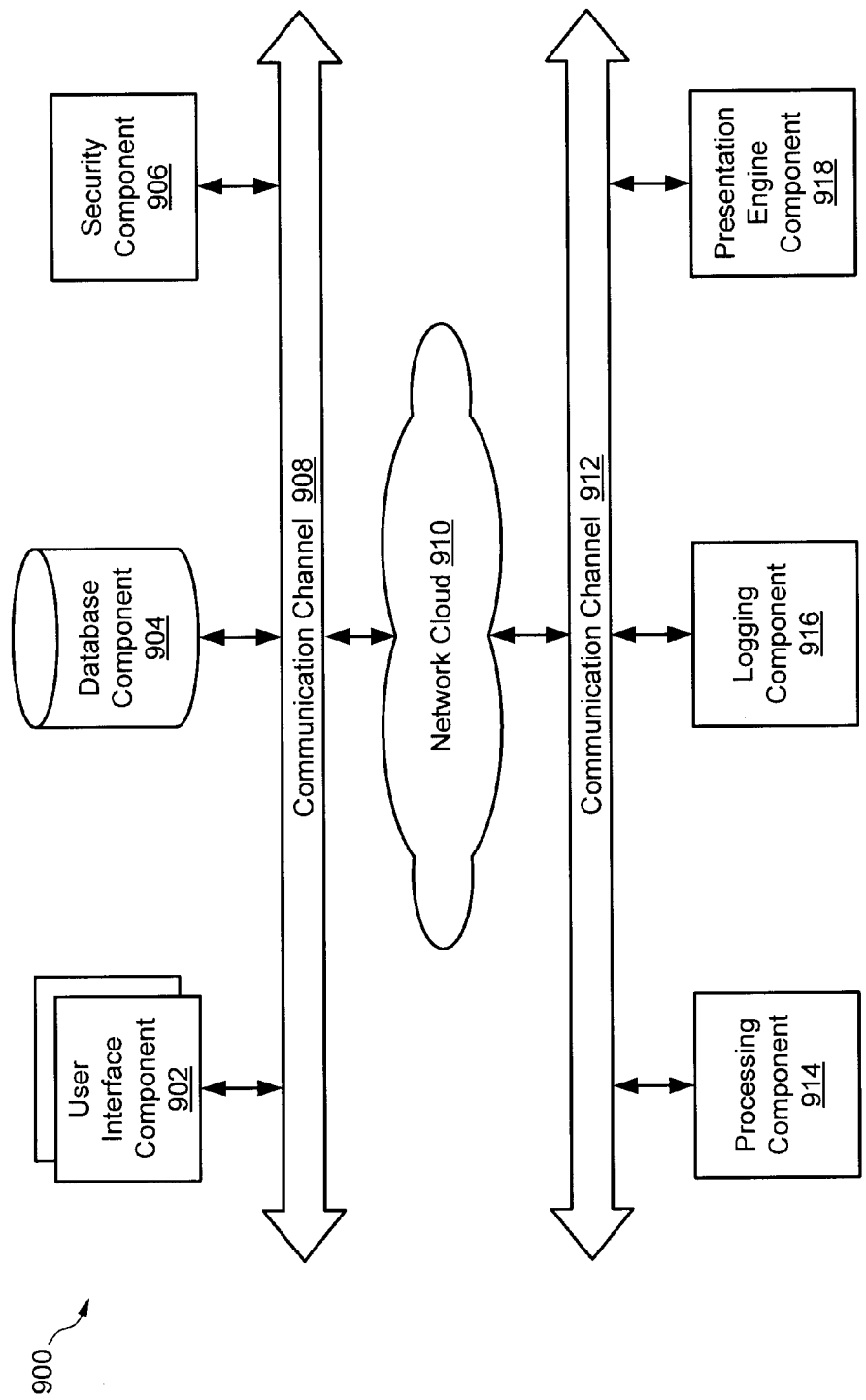
FIG. 9 depicts a possible mapping of a system for compiling a regular expression into bit groups for controlling a content search system, according to some embodiments.

FIG. 9 depicts a possible mapping of a system for compiling a regular expression into bit groups for an associated NFA engine. As shown, a system 900 is provided including a user interface component 902, a database component 904, and a security component 906, which are all in communication, one with another, via a first communication channel 908. Similarly, the processing component 914, logging component 916, and presentation engine component 918 are in communication via a second communication channel 912, as shown. In some embodiments, there may be optionally a network cloud 910 for communication between the first communication channel 908 and the second communication channel 912, possibly through any number of sub-networks (which themselves may contain sub-networks) within the cloud. Also, in some embodiments, the first communication channel 908 may be the same, or otherwise indistinguishable, from the second communication channel 912. Within the flexibility of such possible mappings, one skilled in the art can readily see that the user interface component 902 might be adapted to be operable on a computer in communication with, any other component, with such communication taking place over a network. In exemplary embodiments, there may be more than one instance of a user interface component 902 and, in some embodiments, one instance of a user interface component 902 may share some or no similarities to a second or nth instance of a user interface component 902.

Thus, in one embodiment, modules of a system 900 may serve for advantageously communicating between modules for compiling a source regular expression into a plurality of microprogram instructions.

Figure 10:
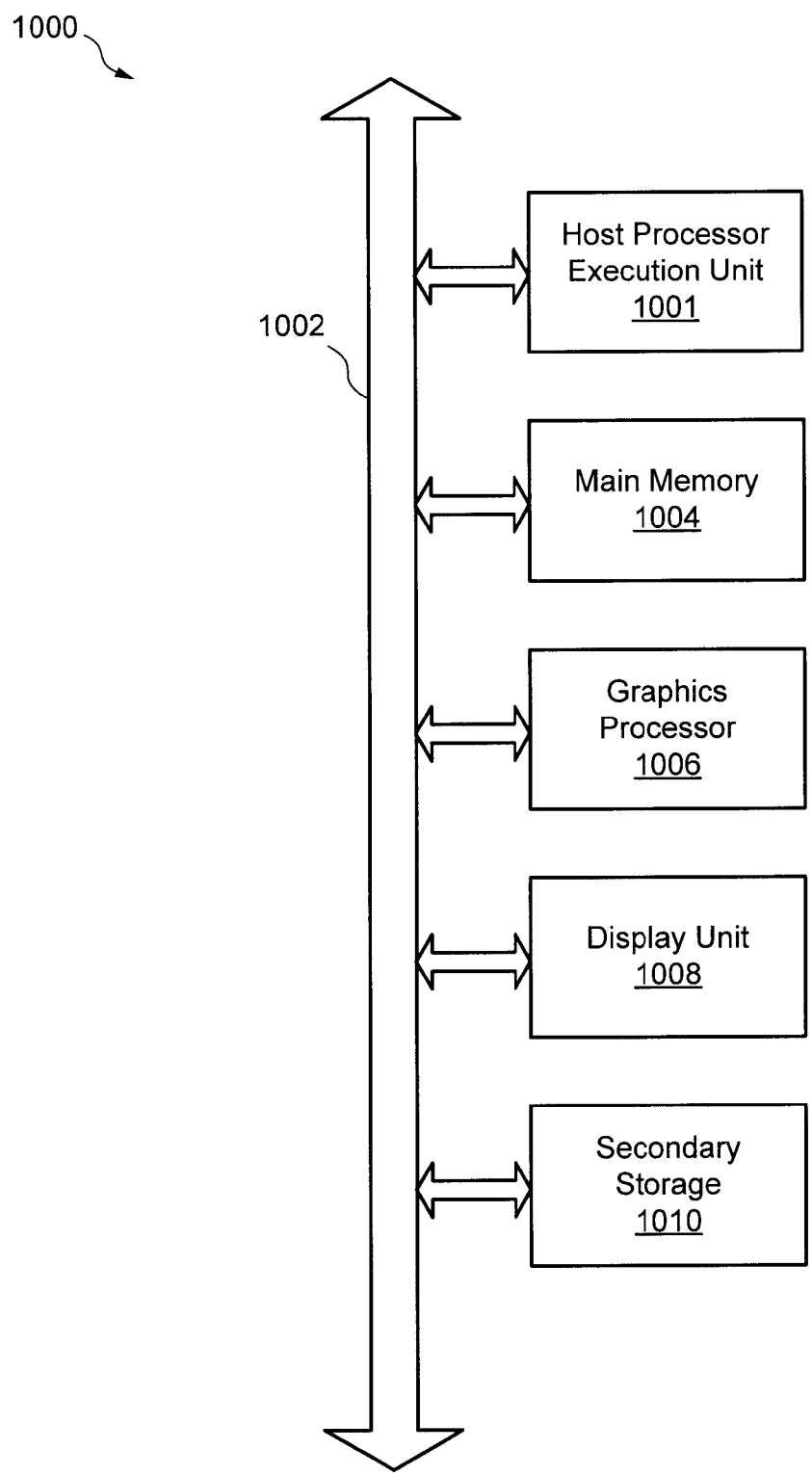
FIG. 10 illustrates an exemplary system in which the architecture and/or functionality of a system for compiling a regular expression into bit groups may be implemented, according to some embodiments.

FIG. 10 illustrates an exemplary system 1000 in which the architecture and/or functionality of the various previous embodiments may be implemented. As shown, a system 1000 is provided including at least one host processor execution unit 1001, which is connected to a communication bus 1002. The system 1000 also includes a main memory 1004 wherein control logic (software) and data are stored and which may take the form of random access memory (RAM). The system 1000 also includes a graphics processor 1006 and a display unit 1008, i.e. a computer monitor. The system 1000 may also include a secondary storage 1010. The secondary storage 1010 includes, for example, a hard disk drive and/or a removable storage drive, representing a floppy disk drive, a magnetic tape drive, a compact disk drive, and/or other tangible computer-readable medium for storing non-transitory computer-readable code.

Computer programs, or computer control logic algorithms, may be stored in the main memory 1004 and/or the secondary storage 1010. Such computer programs, when executed, enable the system 1000 to perform various functions. Main memory 1004, secondary storage 1010, and/or any other storage are possible examples of tangible computer-readable media for storing non-transitory computer-readable code.

In one embodiment, the architecture and/or functionality of the various previous figures may be implemented in the context of the host processor execution unit 1001, the graphics processor 1006, within an integrated circuit (not shown) that is capable of at least a portion of the capabilities of both the host processor execution unit 1001 and the graphics processor 1006.

Further, while not shown, the system 1000 may be coupled to a network (e.g. a telecommunications network, a local area network, a wireless network, a wide area network (WAN) such as the Internet, a peer-to-peer network, a cable network, etc) for communication purposes.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method for compiling a source regular expression into a plurality of microprogram instructions for controlling a content search system, comprising:
    parsing the source regular expression into one or more sub-expressions, comprising an inexact sub-expression associated with an inexact pattern;
    compiling the inexact sub-expression into the plurality of microprogram instructions such that the plurality of microprogram instructions form a contiguous group of microprogram instructions; and
    storing the contiguous group of microprogram instructions into contiguous locations of an instruction memory.

2. The method of claim 1, wherein the parsing differentiates an exact sub-expression from the inexact sub-expression.

3. The method of claim 2, wherein the inexact sub-expression comprises at least one of: a "*" quantifier, a "?" quantifier, a "{n}" quantifier, a "{n,}" quantifier, and a "{n,m}" quantifier.

4. The method of claim 1, wherein at least one of the contiguous group microprogram instructions comprises an opcode, a next instruction address, and a fetch length value.

5. The method of claim 4, wherein the fetch length value indicates a number of instructions to be fetched from contiguous locations in the instruction memory.

6. The method of claim 4, wherein the plurality of microprogram instructions are pre-fetched from the instruction memory into a cache memory in response to the next instruction address and the fetch length value.

7. The method of claim 1, wherein a set of microprogram instructions are pre-fetched from the instruction memory based on one or more operands of a first microprogram instruction.

8. The method of claim 7, wherein the first microprogram instruction comprises an opcode operand, an offset operand, and a fetch length operand.

9. A system for compiling a source regular expression into a plurality of microprogram instructions for controlling a content search system, comprising:
    means for parsing the source regular expression into one or more sub-expressions, comprising an inexact sub-expression associated with an inexact pattern;
    means for compiling the inexact sub-expression into the plurality of microprogram instructions such that the plurality of microprogram instructions form a contiguous group of microprogram instructions; and
    means for storing the contiguous group of microprogram instructions into contiguous locations of an instruction memory.

10. The system of claim 9, wherein the parsing differentiates an exact sub-expression from the inexact sub-expression.

11. The system of claim 10, wherein the inexact sub-expression comprises at least one of: a "*" quantifier, a "?" quantifier, a "{n}" quantifier, a "{n,}" quantifier, and a "{n,m}" quantifier.

12. The system of claim 9, wherein at least one of the contiguous group microprogram instructions comprises an opcode, an offset value, and a fetch length value.

13. The system of claim 12, wherein the fetch length value indicates a number of instructions to be fetched from contiguous locations in the instruction memory.

14. The system of claim 12, wherein the plurality of microprogram instructions are pre-fetched from the instruction memory into a cache memory in response to a next instruction address and the fetch length value.

15. The system of claim 9, wherein a set of microprogram instructions are pre-fetched from the instruction memory based on one or more operands of a first microprogram instruction.

16. The system of claim 15, wherein the first microprogram instruction comprises an opcode operand, an offset operand, and a fetch length operand.

17. A computer program product embodied on a tangible computer readable medium for storing non-transitory data for compiling a source regular expression into a plurality of microprogram instructions for controlling a content search system, the computer program product configured to:
    parse the source regular expression into one or more sub-expressions, comprising an inexact sub-expression associated with an inexact pattern;
    compile the inexact sub-expression into the plurality of microprogram instructions such that the plurality of microprogram instructions form a contiguous group of microprogram instructions; and
    store the contiguous group of microprogram instructions into contiguous locations of an instruction memory.

18. The computer program product of claim 17, wherein the parsing differentiates an exact sub-expression from the inexact sub-expression.

19. The computer program product of claim 18, wherein the inexact sub-expression comprises at least one of: a "*" quantifier, a "?" quantifier, a "{n}" quantifier, a "{n,}" quantifier, and a "{n,m}" quantifier.

20. The computer program product of claim 17, wherein at least one of the plurality of microprogram instructions comprises an opcode, an offset value, and a fetch length value.

21. The computer program product of claim 20, wherein the fetch length value indicates a number of instructions to be fetched from contiguous locations in the instruction memory.

22. The computer program product of claim 20, wherein the plurality of microprogram instructions are pre-fetched from the instruction memory into a cache memory in response to a next instruction address and the fetch length value.

23. The computer program product of claim 17, wherein a set of microprogram instructions are pre-fetched from the instruction memory based on one or more operands of a first microprogram instruction.

24. The computer program product of claim 23, wherein the first microprogram instruction comprises an opcode operand, an offset operand, and a fetch length operand.

* * * * *